(12) United States Patent
Guarda et al.

(10) Patent No.: US 6,818,275 B2
(45) Date of Patent: Nov. 16, 2004

(54) COMPOSITE TILE FOR FLOORING

(75) Inventors: Maurizio Guarda, Nuvolera (IT); Marco Sabatini, Nuvolera (IT)

(73) Assignee: Bresciana Graniti S.p.A. (IT)

( * ) Notice: Subject to any disclaimer, the term of this patent is extended or adjusted under 35 U.S.C. 154(b) by 0 days.

(21) Appl. No.: 10/326,030

(22) Filed: Dec. 18, 2002

(65) Prior Publication Data

US 2003/0129357 A1 Jul. 10, 2003

(30) Foreign Application Priority Data

Dec. 18, 2001 (EP) .............................................. 01830775

(51) Int. Cl.⁷ ................................................ B32B 3/02
(52) U.S. Cl. ........................ 428/119; 428/49; 428/157; 428/164; 404/44; 404/45; 52/612
(58) Field of Search ............................. 428/49, 45, 44, 428/119, 157, 163, 164; 52/612, 177; 404/44, 45

(56) References Cited

U.S. PATENT DOCUMENTS 3,723,233 A    3/1973  Bourke
4,973,506 A    11/1990 Bauer et al.

FOREIGN PATENT DOCUMENTS

| EP | 0 375 830 A1 | 7/1990 |
| EP | 0 685 614 A1 | 12/1995 |
| FR | 2 553 454 A1 | 4/1985 |
| WO | WO-01/86094 A1 | 11/2001 |

*Primary Examiner*—Alexander S. Thomas
(74) *Attorney, Agent, or Firm*—Akerman Senterfitt

(57) ABSTRACT

A composite floor tile is disclosed which can be installed without bonding it to a floor foundation or an existing floor. This composite tile comprises a base member of a metal material which is bonded on its top to a slab of a stone material and is bonded on its bottom to at least one rest member intended for ground contact. 14. A composite tile according to either claim 10 or 11, wherein the material from which said rests (7) are formed is selected from a group comprising architectural- or industrial-grade rubber, soft polyvinylchloride (PVC), pressed felt, latex, and silicone.

17 Claims, 3 Drawing Sheets

COMPOSITE TILE FOR FLOORING

FIELD OF APPLICATION

The present invention broadly relates to the building industry. In particular, the invention relates to a composite floor tile.

PRIOR ART

Covering floor foundations with ceramic materials or naturally occurring stone materials such as marble or granite is a practice that has been long favored on account of the wearing properties and the aesthetic appeal of floors so finished.

It is a well recognized fact that current floor covering procedures involve sundry operations, among which that of securing the tiles onto the floor foundation, which are time consuming and labor intensive.

These procedures include fixing the tiles in place by means of an adhesive, or by spreading a cement-based composition over the floor foundation to provide a bedding layer for the tiles.

The fixing with adhesive is advantageous on several counts, but has limitations where the floor foundation is affected by rising damp (2% residual moisture is recognized to be the upper limit for floor foundations), or whenever the foundation surface appears crumbly, dusty, or likely to develop cracks.

Where the fixing with adhesive is impracticable, a layer of a cement-based material is preferably interposed between the floor foundation surface and the tiles; this material improving the stiffness characteristic of the floor foundation provides a firmer and more durable bond of the tiles to the floor foundation even when the latter shows damp.

However, spreading such a layer of cement-based material is a time consuming and labor intense procedure that involves additional significant costs.

Furthermore, it should be noted that in addition to the tile setting operations, the floor covering process often demands that the floor foundation surface be primed and the tiled floor dressed. Due to these being fairly complicated operations, a floor covering job necessarily requires the intervention of a skilled personnel and involves high labor costs and long working times of several days. When a floor covering of some costly material, such as marble and granite, is to be installed, the laying the tiles commands special care and skill on the operators' side due to the relatively brittleness of the material.

Finally, it should be noted that the aforementioned problems are intensified when a floor is to be installed on an already existing floor since, in that case, the old covering must be removed first, usually by shattering or otherwise taking it apart.

The underlying technical problem of the present invention is to provide a floor tile with such structural and functional features as to overcome the above shortcomings of the prior art.

SUMMARY OF THE INVENTION

The problem is solved, according to this invention, by a composite floor tile comprising a base member of a metal material, which is bonded on its top to a slab of a stone material and is bonded on its bottom to at least one rest member for ground contact.

The bond of the metal base member to the overlying stone slab and the underlying rest member is provided by means of an adhesive. A preferred adhesive is a two-component polyurethane glue comprising a glue and a hardener.

The slab of stone material is preferably 13 to 17 mm thick and typically square in shape with sides 60 or 50 cm long. Alternatively, the slab may be rectangular and measure 120 cm along its major side and 60 cm along its minor side.

A preferred stone material is granite or marble.

The base member of metal material is preferably a sheet of zinc-galvanised steel 0.5 to 1.0 mm thick, preferably 0.5 mm thick.

According to an embodiment of the invention, the sheet of zinc-galvanized steel has substantially the same dimensions as the stone slab.

In a preferred embodiment of the invention, the slab of stone material has an upper or tread surface and an opposed lower surface, in correspondence of which a perimeter recess is formed; the metal base member is a sheet of zinc-galvanised steel having upturned edges to fashion it into a tray having substantially the same dimensions as the stone slab; and the upturned edges fit in the perimeter recess.

The at least one rest member is preferably in the form of a plurality of rest feet bonded to peripheral regions of the underside of the base member of zinc-galvanized sheet steel. These rest feet are made of a material having adequate strength to bear the combined weight of the stone slab and the metal base member, and able to be deformed elastically under the dynamic loading from tramping on the stone slab surface.

Materials exhibiting the above features include native or recycled rubber or polymer materials such as architectural- or industrial-grade rubber, latex, silicones, soft polyvinyl-chloride (PVC), and fibrous materials such as pressed felt.

The rest feet may be of any shape, and have a small thickness, in the range of 1 to 3 mm, preferably equal to 2 mm.

Preferably, the rest feet are formed from smooth architectural-grade rubber, which is a conventional rubber material comprising a blend of rubber, resins, and inert substances.

As to installation, the composite tiles of this invention are simply laid onto a floor foundation or an existing floor (whether a traditional or a raised one) to produce a desired floor covering.

It has unexpectedly been found that the composite tiles of this invention, once laid down, are "self-setting" so to speak, i.e. are held firmly in place by their own weight, with any side force effectively opposed by their rest feet. It should be noted in this respect that, by reason of the moderate thickness dimensions of the stone slab and the metal base member, these composite tiles are not unduly heavy, and that their weight cannot impair the integrity of the floor foundation or old floor underneath.

This advantageously alleviates the tile laying operations and shortens the overall installation time required since, unlike conventional floor covering techniques, no adhesive or cement-based materials are necessary to bed the tiles in place. In addition, no preliminary removing, shattering, or dislodging work is involved in laying them onto an existing floor.

Thus, installing the floor tiles according to the invention is much easier, such that the installation can be carried out by unskilled personnel, thereby considerable labor cost is saved.

The moderate thickness and weight of the composite tiles according to the invention further reflects on savings in the tile storage and transport costs.

It should be noted, moreover, that the slab of stone material of the tiles according to the invention is effectively protected against moisture penetration since the underlying metal base member forms a barrier to any rising damp from the floor foundation or old floor underneath.

As to the strength, soundproofing, flame reaction and flame resistance of the composite tiles according to the invention, such properties are fully comparable to those of similar prior tiles.

Specifically, the soundproof property of the inventive floor tiles is very good since the rest feet can muffle any resounding with people's steps. As to flame reaction, these composite tiles are classified in Class 1 or 0.

Further features and advantages of the composite floor tile according to the invention will be apparent from the following description of an embodiment thereof, given by way of example and not of limitation with reference to the accompanying drawings.

DETAILED DESCRIPTION

Figure 1:
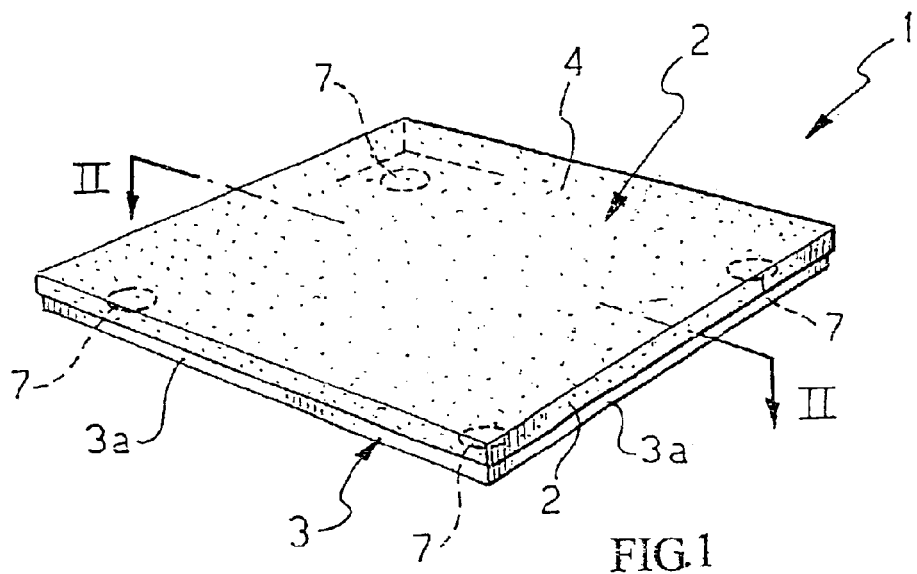
FIG. 1 is a perspective view from above of a composite tile according to the invention.
Figure 1A:
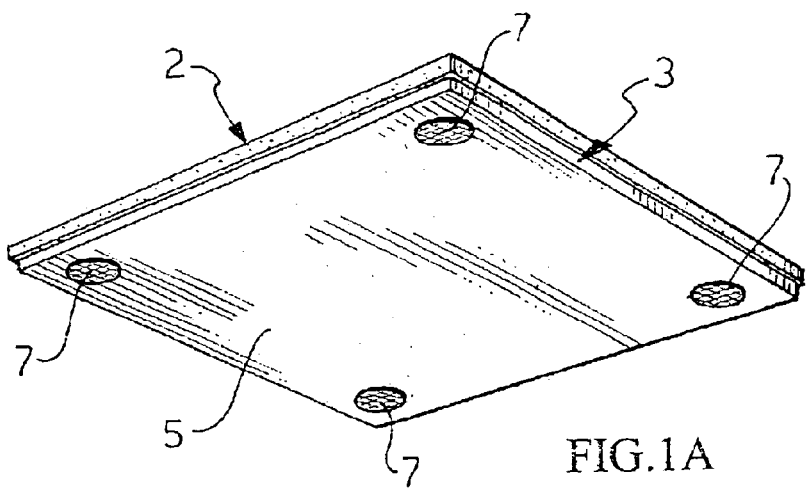
FIG. 1A is a perspective view from below of the composite tile shown in FIG. 1.
Figure 2:
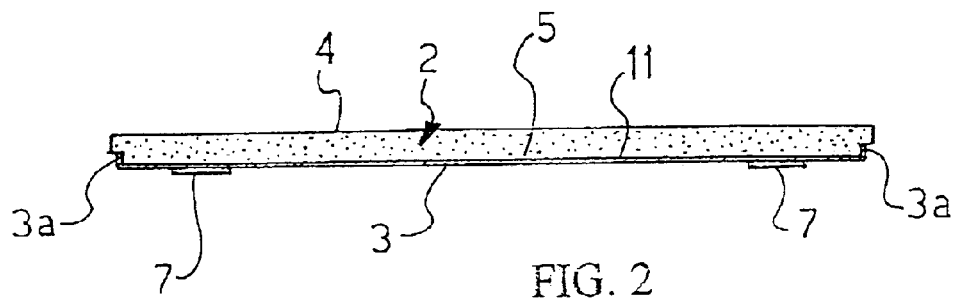
FIG. 2 cross-sectional view of the composite tile shown in FIG. 1, taken along line II—II.

With reference to the drawing views, a composite floor tile 1 according to the invention comprises a slab 2 of a stone material, which is bonded by an adhesive layer 11 to a base member 3 of a metal material, which is in turn bonded to rest feet 7 by another adhesive layer 12.

The adhesive layers consist of a two-components polyurethane glue comprising a glue and a hardener. A preferred glue is a product sold under the trade name Resinlux 100/S MMB and a preferred hardener is a product sold under the trade name CTZ 100/S MMB, both available from the firm Essetre s.r.l.

The slab 2 is preferably of a marble or granite, and has a top or tread surface 4 and an opposed bottom surface 5, in correspondence of which a perimeter recess 6 is formed. The slab is produced and sized according to standard stone material processing methods as applicable to marble and granite.

The base member 3 is a sheet material having upturned edges 3a defining a tray that has substantially the same dimensions as the stone slab 2. In particular, the edges 3a of the sheet member 3 are turned up at right angles to fit fully within the perimeter recess 6.

In this example, the rest feet 7 comprise four circular members of small thickness that are attached to the sheet member 3 in peripheral regions of the latter. It should be understood that the rests 7 may be any shape and size; for example, they may be square, rectangular and/or strip-like.

Typically, with a square slab 2 measuring 60 cm along the side and being 13 mm thick, the tray dimensions would be 59.9×59.9 cm and its thickness 0.5 cm, with 5 cm upturned edges 3a. Also, the rest feet 7 suitably have a diameter of 28 cm and thickness of 2 mm, and locate near the tray corners about 2 cm inward of its edges.

Figure 3:
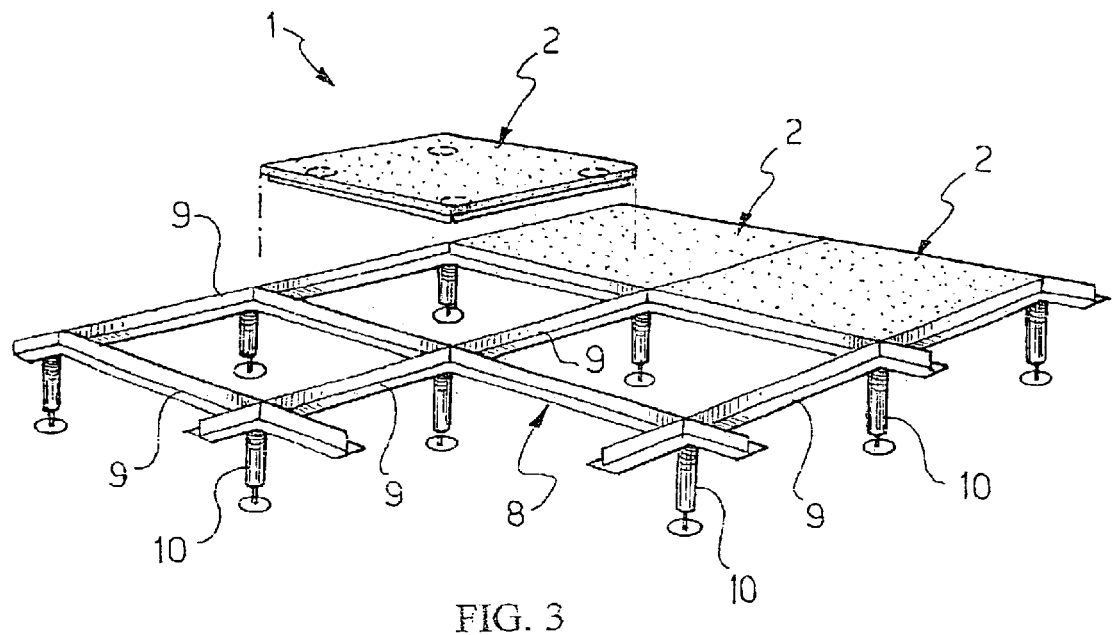
FIG. 3 is a schematic perspective view of a portion of a raised floor comprising composite tiles according to the invention.

FIG. 3 shows a portion of a raised floor, where two composite tiles 1 according to the invention have been laid onto a conventional supporting structure 8 formed of joists 9 and uprights 10.

Figure 3A:
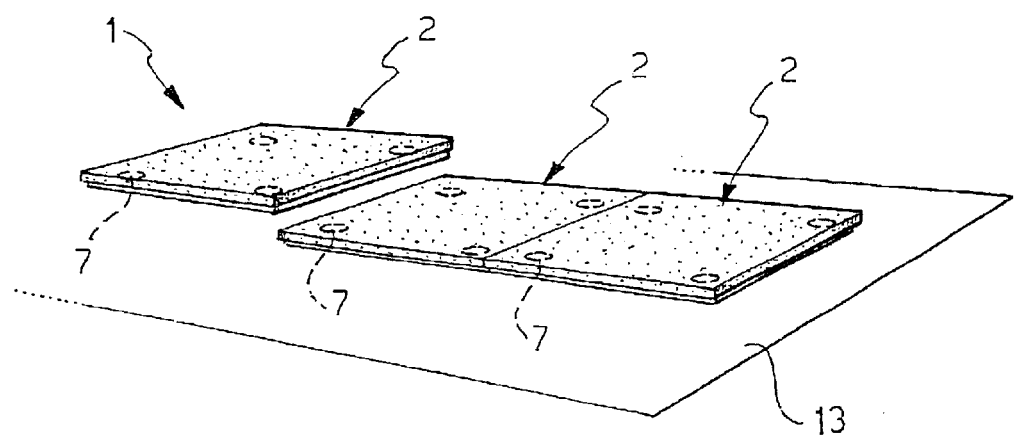
FIG. 3A is a schematic perspective view of a portion of a raised floor where two composite tiles according to the invention have been laid down onto a floor foundation or existing floor, for example.

FIG. 3a shows a floor portion where two composite tiles according to the invention have been laid onto the surface 13 of a floor foundation or an existing floor.

It can be appreciated that the composite tiles of this invention, besides being easy and quick to install, can be installed in greater safety because the sheet member 3 and its upturned edges 3a protect the stone slab 2 against incidental shocks, especially laterally applied shock loads.

Figure 4:
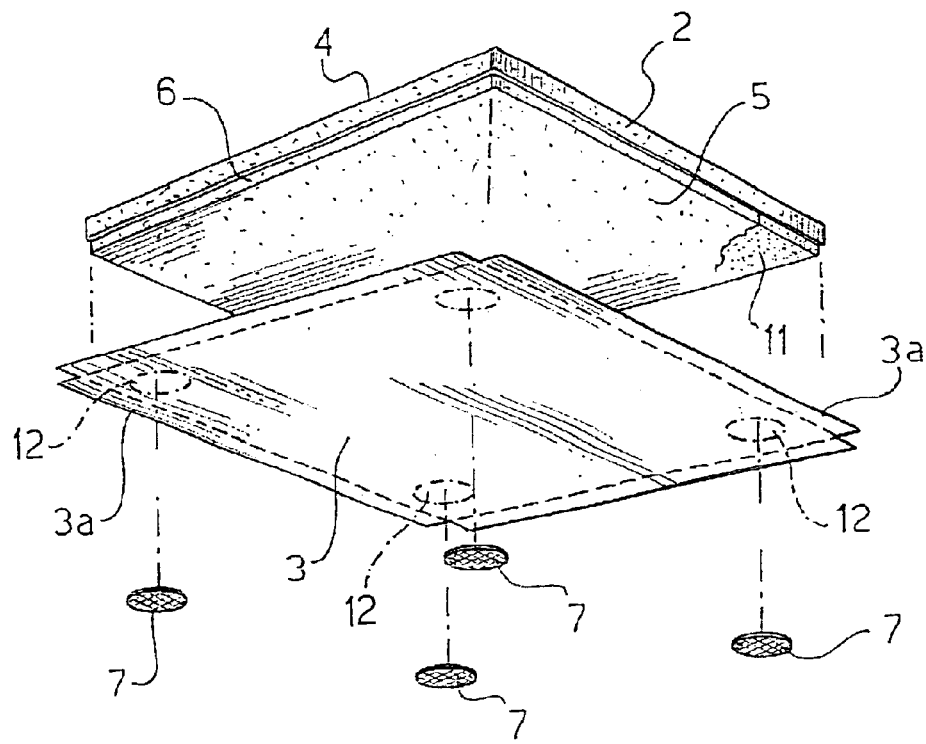
FIG. 4 is an exploded perspective view of a composite tile according to the invention.
Figure 5:
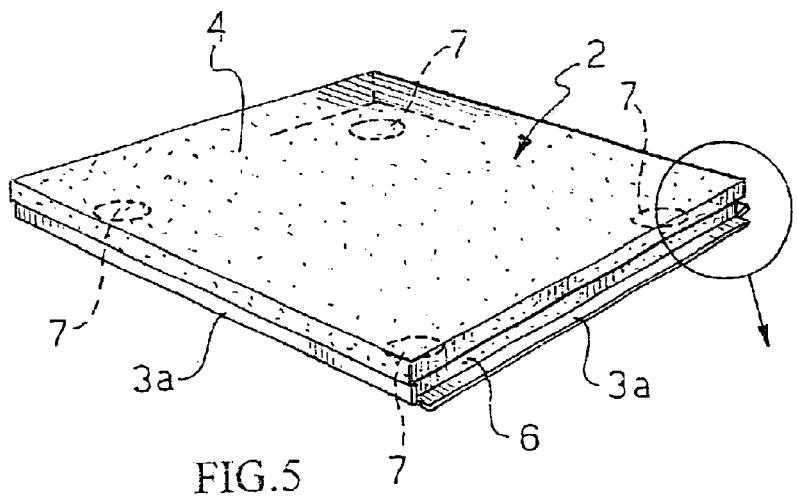
FIG. 5 is a perspective view of a composite tile according to the invention at one stage of its manufacturing process.
Figure 6:
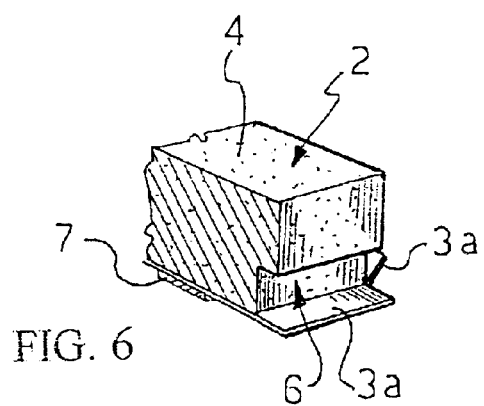
FIG. 6 is an enlarged view of a detail of the composite tile shown in FIG. 5.

The manufacturing process of the composite tile according to the invention (FIGS. 4–6) includes edge fretting the stone slab 2 in correspondence with the bottom surface 5 by conventional procedures to form the perimeter recess 6.

The bottom surface 5 of the slab 2 is then coated with an adhesive layer as far as its perimeter recess 6, and brought to contact the sheet member 3 while the latter is still spread flat. Alternatively, the adhesive layer may be coated over the surface of the sheet member 3 that is to be bonded to the slab 2.

The edges 3a of the sheet member 3 are then bent to obtain a tray, and fit within the perimeter recess 6, where they are bonded to the stone slab 2 by the adhesive layer 11. Finally, the rest feet are bonded to the bottom surface of the sheet member 3 by an adhesive layer 12, which is coated directly over mating regions of said bottom surface. Alternatively, the adhesive layer 12 could be applied to the mating surfaces of the rest feet 7 to bond the latter to the sheet member 3.

While affording the above features and advantages, the composite tiles of this invention also can be laid onto any surfaces, including that of an existing traditional floor or a raised floor, to produce a floor covering of superior quality.

Another advantage of the composite tiles according to the invention is that, whenever necessary, they can be removed, easily and quickly without having to break them loose from their bed, and can be re-used somewhere else.

Another important advantage of the composite tiles according to the invention is they can be manufactured in large volumes at moderate costs.

Of course, many modifications and variations may be made unto the composite tiles just described by a skilled person in the art, which are however comprised within the scope of protection of the invention as defined in the following claims.

What is claimed is:

1. A composite floor tile comprising a base member of a metal material, which is bonded on its top to a slab of stone material and is bonded on its bottom to at least one rest member for ground contact, wherein the slab of stone material has a top or tread surface and an opposed surface in which a perimeter recess is formed, wherein the metal base is a sheet having upturned edges to form a tray whose dimensions are substantially equal to those of the slab of stone material, and wherein the upturned edges are adapted to fit within the perimeter recess.

2. A composite tile according to claim 1, wherein said base member of metal material is bonded to said stone slab and said at least one rest member by means of an adhesive.

3. A composite tile according to claim 1, wherein said adhesive is a two-components polyurethane glue comprising a glue and a hardener.

4. A composite tile according to claim 1, wherein said stone material is selected from granite and marble.

5. A composite tile according to claim 1, wherein the thickness of said slab of stone material is in the range of 13 to 17 mm.

6. A composite tile according to claim 1, wherein said base member of metal material is a sheet of zinc-galvanized steel.

7. A composite tile according to claim 1, wherein the thickness of said sheet is in the range of 0.5 to 1.0 mm.

8. A composite tile according to claim 1, wherein said upturned edges are approximately 5 mm high.

9. A composite tile according to claim 6, wherein said at least one rest member comprise a plurality of rest feet, which are placed under said sheet member of zinc-galvanized steel, and are formed from a material having adequate strength to hear the combined weight of said stone slab and zinc-galvanized steel sheet member, and able to be deformed elastically under the dynamic loads of trampling on the slab of stone material.

10. A composite tile according to claim 8, wherein said at least one rest member comprises a plurality of rest feet, which are placed under said tray, and are formed from a material having adequate strength to bear the combined weight of said stone slab and tray, and able to be deformed elastically under the dynamic loads of trampling on the slab of stone material.

11. A composite tile according to claim 9, wherein the thickness of said rest feet is in the 1 to 3 mm range.

12. A composite tile according to claim 10, wherein the thickness of said rest feet is in the 1 to 3 mm range.

13. A composite tile according to claim 9, wherein the material from which said rests are formed is selected from a group comprising architectural- or industrial-grade rubber, soft polyvinylchloride (PVC), pressed felt, latex, and silicone.

14. A composite tile according to claim 10, wherein the material from which said rests are formed is selected from a group comprising architectural- or industrial-grade rubber, soft polyvinylchloride (PVC), pressed felt, latex, and silicone.

15. A composite tile according to claim 7, wherein the thickness of said sheet is 0.5 mm.

16. A composite tile according to claim 11, wherein the thickness of said rest feet is 2 mm.

17. A composite tile according to claim 12, wherein the thickness of said rest feet is 2 mm.

* * * * *